M. V. Nobles,
Knob Attachment.
No. 48,024. Patented May 30, 1865.
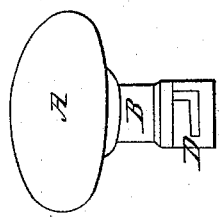
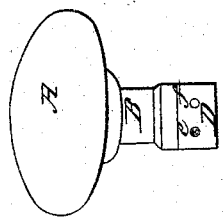
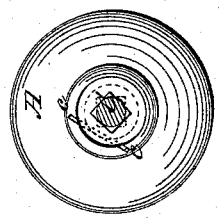
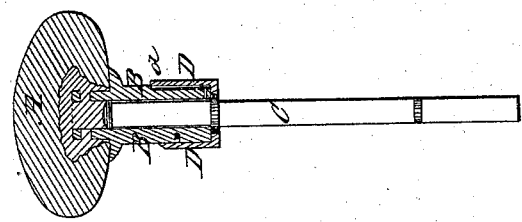
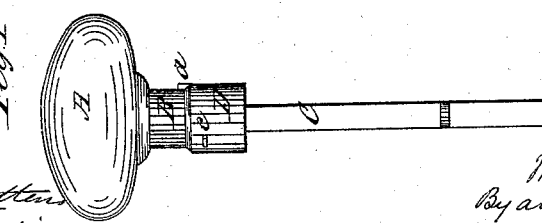
Witnesses
Jn. D. Patten
Thos. J. Chamberlain
Inventor
Milton V. Nobles
By atty A. B. Stoughton.

UNITED STATES PATENT OFFICE.

MILTON V. NOBLES, OF ROCHESTER, ASSIGNOR TO HIMSELF, AND JOHN C. NOBLES, OF RUSHFORD, NEW YORK.

IMPROVEMENT IN FASTENING DOOR-KNOBS TO THEIR SHANKS.

Specification forming part of Letters Patent No. 48,024, dated May 30, 1865.

*To all whom it may concern:*

Be it known that I, MILTON V. NOBLES, of Rochester, in the county of Monroe and State of New York, have invented certain new and useful Improvements in the Manner of Fastening Door and other Knobs to their Shanks; and I do hereby declare that the following is a full, clear, and exact description of the same, reference being had to the accompanying drawings, making a part of this specification, in which—

Figure 1 represents a view of the knob and shank. Fig. 2 represents a section through the same. Fig. 3 represents a view from the end of the shank. Figs. 4 and 5 represent a modification of the fastening.

Similar letters of reference, where they occur in the separate figures, denote like parts in all the drawings.

The nature of my invention consists in the manner in which I have arranged and combined the turning sleeve or boss, the catch, and check pin or pins with the shank and hub, for the purpose of securing the knob to the shank, and so that it may be readily removed and replaced at any time.

To enable others skilled in the art to make and use my invention, I will proceed to describe the same with reference to the drawings.

A represents a knob, and B its hub, the two being united in any of the well-known ways. C is a shank, to which the knob and its hub are to be united. On the hub B, I arrange a turning sleeve or boss, D, which is held thereto by a catch, $a$, and which may turn to a certain extent on the hub, and be there stopped by a check-pin, $c$, or by two check-pins, if so preferred. There is a square opening in the end of the sleeve D, that corresponds in size with the square opening in the hub B, and into these openings the square shank C is inserted.

The sleeve D is then turned so that its square shall stand diagonally to the square in the hub, and, catching into a groove or against shoulders on the shank, firmly and securely hold the hub and shank together.

To define the extent of the turning of the sleeve on the hub, a simple pin, $c$, (or two may be used,) is passed through the sleeve, hub, and across the corner of the shank, and this pin admits of the necessary movement to properly arrange the squares of the sleeve and hub, so as to stand diagonally toward each other, and when in this position the spring-catch $a$ on the hub takes into a suitable opening in the sleeve and holds them in that position, which position firmly unites them to the shank.

In Figs. 4 and 5 a very slight change of check-pin and fastening are shown. The check or guide pin there is in the form of a bayonet-fastening, while the fastening is simply a spring-pin, which takes into one or the other of the holes $e f$, the former holding the sleeve in the position that unites the hub and shank, and the latter in the position in which they may be detached. The check-pin $a$, Fig. 1, is shown as projecting from the sleeve. This is merely to show the pin, for in the finished fastening the check-pin is flush and smooth with the sleeve.

Having thus fully described the nature, object, and purpose of my invention, what I claim therein as new, and desire to secure by Letters Patent, as a fastening for door knobs and shanks, is—

The combined use of the turning sleeve, catch, and check-pin with the hub and shank of the knob, substantially as and for the purpose described.

M. V. NOBLES.

Witnesses:
A. B. STOUGHTON,
J. C. NOBLES.